(12) United States Patent
Sugimoto et al.

(10) Patent No.: US 10,040,510 B2
(45) Date of Patent: *Aug. 7, 2018

(54) BICYCLE SPROCKET AND MULTIPLE BICYCLE SPROCKET ASSEMBLY

(71) Applicant: Shimano Inc., Sakai, Osaka (JP)

(72) Inventors: Akinobu Sugimoto, Osaka (JP); Yuki Hirose, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,369

(22) Filed: Nov. 21, 2016

(65) Prior Publication Data
US 2017/0066500 A1    Mar. 9, 2017

Related U.S. Application Data

(63) Continuation of application No. 14/053,630, filed on Oct. 15, 2013, now Pat. No. 9,701,364.

(60) Provisional application No. 61/824,568, filed on May 17, 2013.

(51) Int. Cl.
*F16H 55/30* (2006.01)
*B62M 1/36* (2013.01)
*B62M 9/10* (2006.01)

(52) U.S. Cl.
CPC ............. *B62M 9/10* (2013.01); *B62M 1/36* (2013.01); *B62M 9/105* (2013.01); *F16H 55/30* (2013.01); *Y10T 74/2165* (2015.01)

(58) Field of Classification Search
CPC ........ Y10T 74/2165; F16H 55/30; B62M 1/36; B62M 9/10
See application file for complete search history.

(56) References Cited

U.S. PATENT DOCUMENTS

| 4,174,642 | A | | 11/1979 | Martin et al. |
| 5,192,248 | A | | 3/1993 | Nagano |
| 5,192,249 | A | | 3/1993 | Nagano |
| 5,192,250 | A | | 3/1993 | Kobayashi |
| 5,716,297 | A | * | 2/1998 | Bodmer .................. B62M 9/10 474/160 |

(Continued)

FOREIGN PATENT DOCUMENTS

| DE | 20 2012 012 533 U1 | | 3/2013 | |
| FR | 2672865 | * | 8/1992 | ............. B62M 9/10 |

(Continued)

*Primary Examiner* — Vinh Luong
(74) *Attorney, Agent, or Firm* — Global IP Counselors, LLP

(57) ABSTRACT

A bicycle sprocket has a sprocket main body, a plurality of teeth disposed on the sprocket main body, and at least one shifting area. The teeth include at least one first tooth having a first maximum axial width and at least one second tooth having a second maximum axial width. The first maximum axial width is larger than the second maximum axial width. The first tooth is configured to engage with an outer link plate of a chain. The second tooth is configured to engage with an inner link plate of the chain. The at least one shifting area includes an area where a chain engages with one of the teeth during shifting from a small sprocket to the bicycle sprocket and an area where the chain separates from one of the teeth during a shifting action from the bicycle sprocket to the small sprocket.

35 Claims, 8 Drawing Sheets

(56) References Cited

U.S. PATENT DOCUMENTS

| | | | |
|---|---|---|---|
| 5,935,033 A * | 8/1999 | Tseng | B62M 9/105 474/116 |
| 6,007,442 A | 12/1999 | Schmidt | |
| 6,013,001 A * | 1/2000 | Miyoshi | B62M 9/10 474/156 |
| 6,340,338 B1 * | 1/2002 | Kamada | B62M 9/10 474/152 |
| 8,096,908 B2 * | 1/2012 | Oishi | B62M 9/10 474/160 |
| 8,550,944 B2 | 10/2013 | Esquibel | |
| 8,978,514 B2 | 3/2015 | Shiraishi | |
| 9,150,277 B2 | 10/2015 | Emura et al. | |
| 9,919,764 B2 * | 3/2018 | Fukumori | F16H 55/30 |
| 2003/0073530 A1 * | 4/2003 | Mao | B62M 9/10 474/160 |
| 2004/0043855 A1 * | 3/2004 | Wei | B62M 9/10 474/160 |
| 2005/0079940 A1 * | 4/2005 | Reiter | F16H 55/30 474/160 |
| 2005/0282671 A1 | 12/2005 | Emura et al. | |
| 2006/0135304 A1 | 6/2006 | Sonoda | |
| 2007/0054768 A1 | 3/2007 | Miyazawa | |
| 2007/0265122 A1 | 11/2007 | Emura et al. | |
| 2009/0098966 A1 * | 4/2009 | Kamada | B62M 9/10 474/160 |
| 2009/0111631 A1 | 4/2009 | Wickliffe et al. | |
| 2010/0137086 A1 | 6/2010 | Lin | |
| 2011/0183795 A1 * | 7/2011 | Emura | B62M 9/136 474/80 |
| 2012/0196711 A1 * | 8/2012 | Loy | B62M 9/10 474/160 |
| 2013/0109519 A1 | 5/2013 | Morita | |
| 2013/0139642 A1 | 6/2013 | Reiter et al. | |
| 2015/0191214 A1 | 7/2015 | Emura et al. | |
| 2017/0101159 A1 * | 4/2017 | Watarai | B21K 23/00 |
| 2017/0146109 A1 * | 5/2017 | Reiter | B62M 9/105 |
| 2017/0247081 A1 * | 8/2017 | Sugimoto | B62M 9/10 |
| 2017/0370458 A1 * | 12/2017 | Kamada | F16H 55/0873 |

FOREIGN PATENT DOCUMENTS

| | | |
|---|---|---|
| JP | 5-330479 A | 12/1993 |
| JP | 6-115481 A | 4/1994 |
| TW | M434735 U1 | 8/2012 |

* cited by examiner

BICYCLE SPROCKET AND MULTIPLE BICYCLE SPROCKET ASSEMBLY

CROSS REFERENCE TO RELATED APPLICATIONS

This application claims the benefit of U.S. Provisional Application No. 61/824,568, filed on May 17, 2013. Also, this application is a continuation application of U.S. patent application Ser. No. 14/053,630, filed on Oct. 15, 2013. The entire disclosure of U.S. Provisional Application No. 61/824,568 and U.S. patent application Ser. No. 14/053,630 is hereby incorporated herein by reference.

BACKGROUND

Field of the Invention

This invention generally relates to a bicycle sprocket and a multiple bicycle sprocket assembly including the bicycle sprocket.

Background Information

Bicycle sprockets are provided both to a crank assembly located in the middle of a bicycle and to the rear wheel, and the rotation of the crank assembly is transmitted to the rear wheel by a chain meshed with the sprockets. In a bicycle chain, an inner link plate and an outer link plate are linked alternately; therefore, when the teeth of the sprockets have the same thickness, the gaps between the outer link plate and the teeth of the sprockets are larger than the gaps between the inner link plate and the teeth of the sprockets. In view of this, there are conventionally known sprockets (Specification of U.S. Pat. No. 4,174,642, for example) in which the axial width of the teeth (the teeth thickness), relative to the rotational center axis direction of the sprocket, is designed such that the axial width of the teeth meshing with the outer link plate is larger than the axial width of the teeth meshing with the inner link plate. A conventional sprocket has teeth that taper diametrally outward. It is thereby unlikely that the gaps between the sprocket and chain will become smaller and that the chain will separate from the teeth of the sprocket.

A multiple bicycle sprocket assembly comprises a plurality of sprockets. Among such multiple bicycle sprocket assemblies, one known example is a bicycle crank assembly in which a plurality of sprockets having different numbers of teeth are mounted to a crank arm. The sprockets are provided for shifting, and the chain is moved by a derailleur between the two or more sprockets having different numbers of teeth to perform the shifting action.

SUMMARY

A sprocket having teeth that have different axial widths relative to the rotational center axis direction of the sprocket is a structure for preventing the chain from easily separating from the teeth of the sprocket. Therefore, when a sprocket having teeth that have different axial widths is employed in a conventional crank assembly for moving a chain between two sprockets, the shifting action becomes complicated.

A problem of the present invention is to make the shifting action easier in a sprocket having teeth that have different axial widths.

A bicycle sprocket according to the present invention has a rotational center axis and is capable of engaging with a chain. The bicycle sprocket comprises a sprocket main body, a plurality of teeth disposed along a circumferential direction on the radially outer side of the sprocket main body, and at least one shifting area. The at least one shifting area includes an area where the chain engages with one of the plurality of teeth of the bicycle sprocket during a shifting action from a small sprocket to the bicycle sprocket and an area where the chain separates from one of the plurality of teeth of the bicycle sprocket during a shifting action from the bicycle sprocket to the small sprocket. The plurality of teeth include at least one tooth having a first maximum axial width and at least one second tooth having a second maximum axial width, the first maximum axial width being larger than the second maximum axial width. The first tooth is formed to be capable of engaging with an outer link plate of the chain. The second tooth is formed to be capable of engaging with an inner link plate of the chain.

In this bicycle sprocket, the chain is mounted to the sprocket so that the first tooth of greater axial width engages with an outer link, and the second tooth of less axial width than the first tooth engages with an inner link. When the chain is disposed in at least one shifting area for guiding the chain so that the chain readily separates from the sprocket teeth in order to shift, the chain is guided and moved to another sprocket. Because at least one shifting area is provided to the sprocket, the shifting action is performed easily in the sprocket having teeth that have different axial widths.

The plurality of teeth may include a plurality of first teeth. In this case, the bicycle sprocket can effectively hold the outer link of the chain.

The plurality of teeth may include a plurality of second teeth. In this case, the bicycle sprocket can effectively hold the inner link. The plurality of teeth may include a plurality of first teeth and a plurality of second teeth. In this case, the bicycle sprocket can effectively hold the outer link and the inner link of the chain.

At least some of the plurality of first teeth and the plurality of second teeth may be disposed alternately in the circumferential direction. In this case, the chain can be more effectively prevented from easily separating from the teeth of the sprocket.

The first teeth may be formed into a + shape as seen from the radially outer side. In this case, because only part of the axial width is increased rather than all of the axial width being increased, the weight of the sprocket can be prevented from increasing more than is necessary even if the axial width is increased.

The first teeth may be formed into a T shape as seen from the radially outer side. In this case, because only part of the axial width is increased rather than all of the axial width being increased, the weight of the sprocket can be prevented from increasing more than is necessary even if the axial width is increased.

The first maximum axial width of the first teeth may be in a range of 2.5 mm or greater and 5.4 mm or less. In this case, the first teeth can be made to engage with the outer link instead of the inner link.

The first maximum axial width of the first teeth may be in a range of 3.0 mm or greater and 4.5 mm or less. In this case, the first teeth can be made to reliably engage with the outer link even if the chain is for a multi-speed rear sprocket assembly of ten or more speeds.

The second maximum axial width of the second teeth may be in a range of 1.5 mm or greater and 2.3 mm or less. In this case, the second teeth can be made to reliably engage with the inner link.

The shifting area may include shifting teeth provided to at least one of any of the plurality of teeth. Because the shifting area includes shifting teeth formed into either a shape that allows the chain to separate readily from the sprocket teeth or a shape that allows the chain to readily engage with the teeth of the other sprocket when the chain moves to the other sprocket, the shifting action can be performed smoothly.

The shifting teeth may have guide surfaces for guiding the chain. In this case, a smooth shifting action is made possible because the chain is guided by the guide surfaces of the shifting teeth.

The shifting area may include at least one protuberance formed to be capable of supporting the chain. In this case, when the chain is guided from the smaller-diameter sprocket to the larger-diameter sprocket, the chain can be supported on the larger-diameter sprocket by the protuberance, and the chain therefore moves readily to the larger-diameter sprocket.

At least one protuberance may include a first protuberance and a second protuberance formed to be capable of supporting the chain. In this case, due to the first protuberance and the second protuberance being disposed in different positions in the radial direction of the sprocket, the chain can be supported on the first protuberance and guided to the second protuberance, and the chain can be supported on the second protuberance and guided to the teeth of the sprocket. Therefore, the chain moves readily to the larger-diameter sprocket.

The distance between the first protuberance and the second protuberance may be longer than the longitudinal length of an outer link of the chain and/or an inner link of the chain. In this case, the chain can be supported in a wide range by supporting different links of the chain on the first protuberance and the second protuberance.

The distance between the first protuberance and the second protuberance may be either equal to or shorter than the longitudinal length of an outer link of the chain and/or an inner link of the chain. The chain can be reliably supported by supporting one link of the chain on the first protuberance and the second protuberance.

The shifting area may include a concave part disposed farther inward in the radial direction than the base portions of the plurality of teeth. In this case, the chain can be efficiently guided to the larger-diameter sprocket because the chain can be guided by the concave part farther inward in the radial direction than the base portions.

A plurality of shifting areas may be provided. In this case, the shifting action can be performed quickly due to a plurality of shifting areas being provided at intervals in the circumferential direction, for example.

At least a pair of the shifting areas may be provided. In this case, due to at least a pair of the plurality of shifting areas being provided at intervals in the circumferential direction, for example, the shifting action can be completed in one shifting area even if the shifting action is not completed in another shifting area.

The bicycle sprocket according to the present invention may be a front sprocket. In this case, it is possible to provide a front sprocket whereby the chain can be stably held during the normal pedaling action and a shifting action is also possible.

A bicycle sprocket according to another aspect of the present invention has a rotational center axis and is capable of engaging with a chain. The bicycle sprocket comprises a sprocket main body, a plurality of teeth disposed along a circumferential direction on the radially outer side of the sprocket main body, and at least one shifting area. The plurality of teeth include at least one first tooth having a first maximum axial width for engaging with an outer link plate of the chain and at least one second tooth having a second maximum axial width for engaging with an inner link plate of the chain. The first maximum axial width is larger than the second maximum axial width. The at least one first tooth includes a shifting tooth that is included in the at least one shifting area. The shifting tooth is formed into a T shape as seen from the radially outer side.

In this bicycle sprocket, the chain is mounted to the sprocket so that the first tooth of greater axial width engages with an outer link, and the second tooth of less axial width than the first tooth engages with an inner link. When the chain is disposed in at least one shifting area for guiding the chain so that the chain readily separates from the sprocket teeth in order to shift, the chain is guided and moved to another sprocket. Because at least one shifting area is provided to the sprocket, the shifting action is performed easily in the sprocket having teeth that have different axial widths. Additionally, with this aspect of the invention, because only part of the axial width of the shifting tooth is increased rather than all of the axial width being increased, the weight of the sprocket can be prevented from increasing more than is necessary even if the axial width is increased.

A bicycle sprocket according to another aspect of the present invention has a rotational center axis and is capable of engaging with a chain. The bicycle sprocket comprises a sprocket main body, a plurality of teeth disposed along a circumferential direction on the radially outer side of the sprocket main body, and at least one shifting area. The plurality of teeth include at least one first tooth having a first maximum axial width for engaging with an outer link plate of the chain and at least one second tooth having a second maximum axial width for engaging with an inner link plate of the chain. The first maximum axial width is larger than the second maximum axial width. The first maximum axial width is larger than the second maximum axial width, and the first maximum axial width of the first teeth is equal to or larger than 2.5 mm and smaller than or equal to 5.4 mm.

In this bicycle sprocket, the chain is mounted to the sprocket so that the first tooth of greater axial width engages with an outer link, and the second tooth of less axial width than the first tooth engages with an inner link. When the chain is disposed in at least one shifting area for guiding the chain so that the chain readily separates from the sprocket teeth in order to shift, the chain is guided and moved to another sprocket. Because at least one shifting area is provided to the sprocket, the shifting action is performed easily in the sprocket having teeth that have different axial widths. Additionally, due to the size limitation of the first maximum axial width, the first teeth can be made to engage with the outer link instead of the inner link.

In this aspect of the invention, the first maximum axial width of the first teeth may be equal to or larger than 3.0 mm and smaller than or equal to 4.5 mm. In this case, the first teeth can be made to reliably engage with the outer link even if the chain is for a multi-speed rear sprocket assembly of ten or more speeds.

In this aspect of the invention, the second maximum axial width of the second teeth may be equal to or larger than 1.5 mm and smaller than or equal to 2.3 mm. In this case, the second teeth can be made to reliably engage with the inner link.

In another aspect of the invention, a multiple bicycle sprocket assembly comprises a first sprocket and a second sprocket. The first sprocket includes a first sprocket body, a plurality of first sprocket teeth, and at least one first shifting area. The first sprocket teeth are disposed along a circumferential direction on a radially outer side of the first sprocket body. The plurality of first sprocket teeth include at least one first tooth and at least one second tooth. The at least one first tooth has a first maximum axial width for engaging with an outer link plate of the chain, and the at least one second tooth has a second maximum axial width for engaging with an inner link plate of the chain. The first maximum axial width is larger than the second maximum axial width. Meanwhile, the second sprocket includes a second sprocket body and a plurality of second sprocket teeth. The second sprocket teeth are disposed along a circumferential direction on a radially outer side of the second sprocket body. All of second sprocket teeth have a third maximum axial width for engaging with the inner link plate of the chain. The first maximum axial width is larger than the third maximum axial width.

According to the present invention, because at least one shifting area is provided to the sprocket, the shifting action is easier in a sprocket having teeth that have different axial widths.

According to another aspect of the present invention, the chain can be held in a stable manner on the first sprocket or the second sprocket during the normal pedaling action.

Also other objects, features, aspects and advantages of the present invention will become apparent to those skilled in the art from the following detailed description, which, taken in conjunction with the annexed drawings, discloses preferred embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
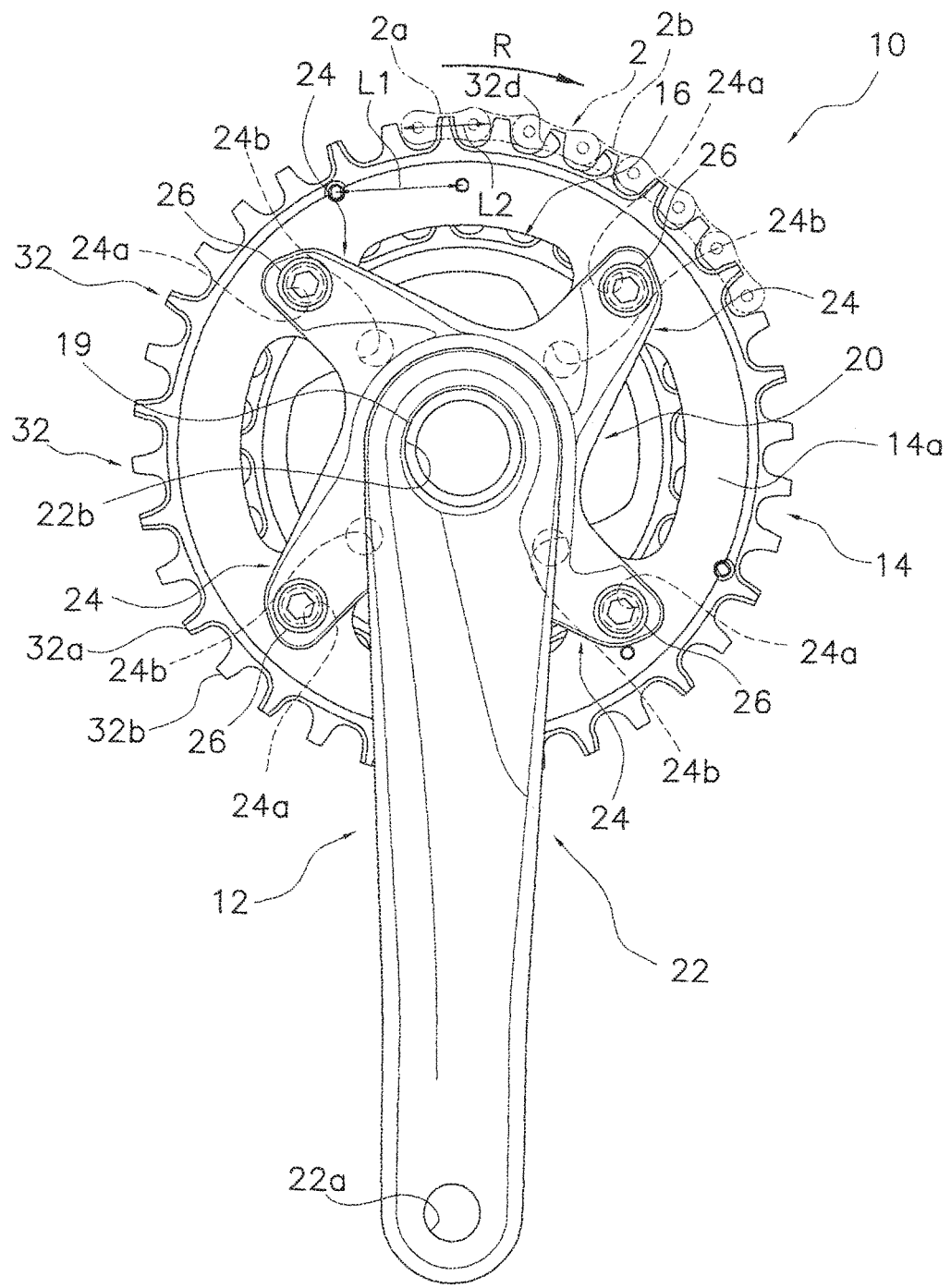
FIG. 1 is a front view of a bicycle crank assembly according to the first embodiment of the present invention.

In FIG. 1, a bicycle crank assembly (referred to as a crank assembly below) 10 according to the first embodiment of the present invention comprises a crank arm 12, and a first sprocket 14 and second sprocket 16 which are bicycle sprockets according to an embodiment of the present invention. The first sprocket 14 and the second sprocket 15 are front sprockets that can engage with a chain 2. The second sprocket 16 has fewer teeth than the first sprocket 14. The chain 2 has an outer link plate 2a and an inner link plate 2b.

Crank Arm

The crank arm 12 is integrally and rotatably linked to a crankshaft 19. The crank arm 12 has a sprocket attachment part 20, and an arm part 22 provided either integrally to or separate from the sprocket attachment part 20.

The sprocket attachment part 20 has a plurality (e.g. four) of sprocket attachment arms 24 disposed at intervals in the circumferential direction. The circumferential intervals of the sprocket attachment arms 24 may be equal intervals but may also be unequal intervals. In the first embodiment, the sprocket attachment arms 24 are disposed at equal intervals and are slanted upstream in advancing rotational direction R of the crank arm 12 relative to the radial direction. The sprocket attachment arms 24 have first attachment parts 24a for attaching the first sprocket 14. The first attachment parts 24a are formed in the distal ends of the sprocket attachment arms 24. The sprocket attachment arms 24 have second attachment parts 24b for attaching the second sprocket 16. The second attachment parts 24b are formed farther inward in the radial direction than the first attachment parts 24a. The first attachment parts 24a and the second attachment parts 24b are configured from through-holes, for example, or screw holes or the like through which nothing else passes. In the first embodiment, the first attachment parts 24a are configured from through-holes, and the second attachment parts 24b are configured from screw holes through which nothing else passes. The first sprocket 14 is fixed to the first attachment parts 24a by first fixing bolts 26. The second sprocket 16 is fixed to the second attachment parts 24b by second fixing bolts 28 (see FIG. 4).

The arm part 22 is formed either integrally with or separate from the sprocket attachment part 20. In the first embodiment, the arm part 22 is configured integrally with the sprocket attachment part 20. The arm part 22 has a pedal attachment part 22a in which a pedal (not shown) can be mounted in the distal end, and a linking hole 22b to which the crankshaft 19 is integrally and rotatably linked in the proximal end.

First Sprocket

The first sprocket 14 has a rotational center axis X, and comprises a first sprocket main body 30, a plurality (e.g. 30 to 60) of teeth 32 disposed along the circumferential direction on the radially outer side of the first sprocket main body 30, and a first shifting area 34, as shown in FIGS. 2 to 5. The first sprocket main body 30 is an example of a sprocket main body. The first shifting area 34 is an example of a shifting area. The term "shifting area" in the present invention means either an area where the chain engages with the teeth of a large sprocket during an up shifting action from a small sprocket to a large sprocket, or an area where the chain separates from the teeth of the large sprocket during a down shifting action from the large sprocket to the small sprocket. The first sprocket main body 30 and the teeth 32 are made of metal and are formed integrally. The first sprocket main body 30 has a plurality (e.g. four) of first fixed parts 30a fixed to the first attachment parts 24a of the sprocket attachment arms 24 and disposed at intervals in the circumferential direction. In the first embodiment, the first fixing parts 30a are configured from through-holes, and are disposed in positions facing the plurality of first attachment parts 24a. The first sprocket 14 is fixed to the sprocket attachment arms 24 by the first fixing bolts 26 and a nut member (not shown) threaded with the first fixing bolts 26.

There are thirty-six of the teeth 32 in the first embodiment, for example. The teeth 32 include at least one first tooth 32a having a first maximum axial width W1 (see FIG. 5), and at least one second tooth 32b having a second maximum axial width W2. The first teeth 32a are formed to be capable of engaging with an outer link plate 2a of the chain 2. The second teeth 32b are formed to be capable of engaging with an inner link plate 2b of the chain 2. The first maximum axial width W1 is greater than the second maximum axial width W2. The first maximum axial width W1 of the first teeth 32a is in a range of preferably 2.5 mm or greater and 5.4 mm or less, and more preferably in a range of 3.0 mm or greater and 4.5 mm or less. When the first maximum axial width W1 of the first teeth 32a is in such a range, the first teeth 32a readily with the outer link plate 2a without engaging with the inner link plate 2b. The second maximum axial width W2 of the second teeth 320 is preferably in a range of 1.5 mm or greater and 2.3 mm or less. When the second maximum axial width W2 of the second teeth 32b is in such a range, the second teeth 32b have the necessary rigidity and readily engage with the inner link plate 2b.

Figure 2:
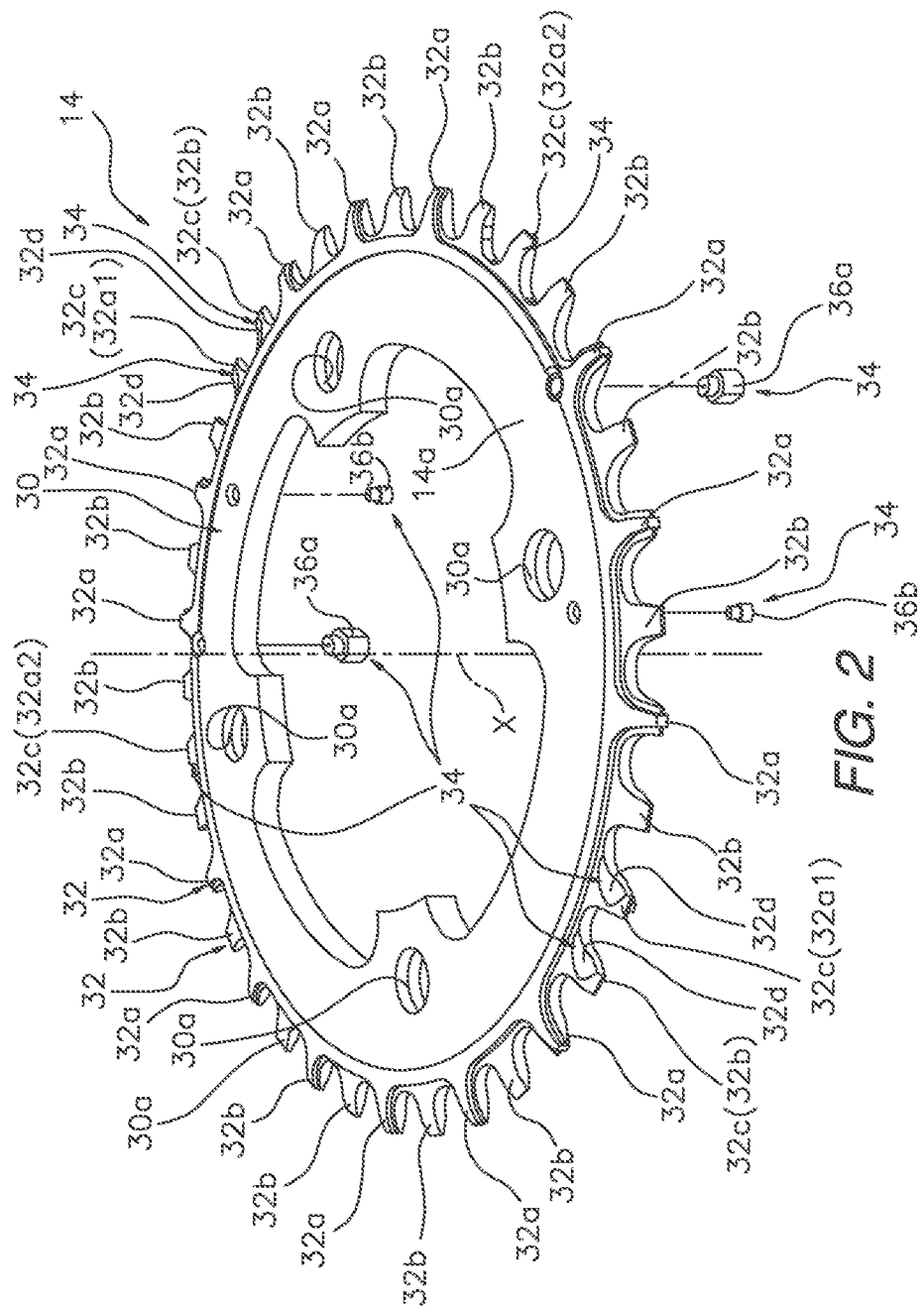
FIG. 2 is a front perspective view of the first sprocket.

The first teeth 32a are preferably formed into a + (plus) shape as seen from the radially outer side, as shown in FIGS. 2 to 5. The second teeth 32b are preferably formed into a − (minus) shape as seen from the radially outer side. The first teeth 32a and the second teeth 32b are formed tapering so as to gradually decrease in axial width toward the radially outer side. The first teeth 32a and the second teeth 32b thereby engage more readily with the outer link plate 2a and the inner link plate 2b. Among the plurality of first teeth 32a, first teeth 32a1 and first teeth 32a2, which are shifting teeth 32c described hereinafter, are formed into T shapes as seen from the radially outer side in the first embodiment, as shown in FIG. 2. The first teeth 32a1 are shifting teeth 32c for down shifting wherein the chain 2 moves from the first sprocket 14 to the second sprocket 16, and the first teeth 32a2 are shifting teeth 32c for up shifting wherein the chain 2 moves from the second sprocket 16 to the first sprocket 14. The first teeth 32a1 are an example of a second area of a shifting area, and the first teeth 32a2 are an example of a first area of a shifting area. In the first embodiment, the first maximum axial width of the T-shaped first teeth 32a1, 32a2 is less than the first maximum axial width W1 of the + shaped first teeth 32a, and greater than the second maximum axial width W2 of the − shaped second teeth 32b.

At least some of the first teeth 32a and the second teeth 32b are disposed alternately in the circumferential direction, i.e. adjacent to each other, and in the first embodiment all of these teeth are disposed in this manner as shown in FIG. 2.

The first shifting area 34 includes the first shifting teeth 32c, which are provided to at least one of the teeth 32. The first shifting teeth 32c are an example of shifting teeth. In the first embodiment, a plurality (e.g. four) of first shifting teeth 32c is provided. The first shifting teeth 32c are provided between the linked first teeth 32a1 and second teeth 32b. The first shifting area 34 includes a first protuberance 36a and a second protuberance 36b, which are formed so as to be capable of supporting the chain 2. The first protuberance 36a and the second protuberance 36b are an example of protuberances. Furthermore, the first shifting area 34 includes a concave part 38 disposed farther diametrally inward than the roots of the teeth 32. The base portions 32e correspond to the radially innermost portions of the teeth 32.

Figure 3:
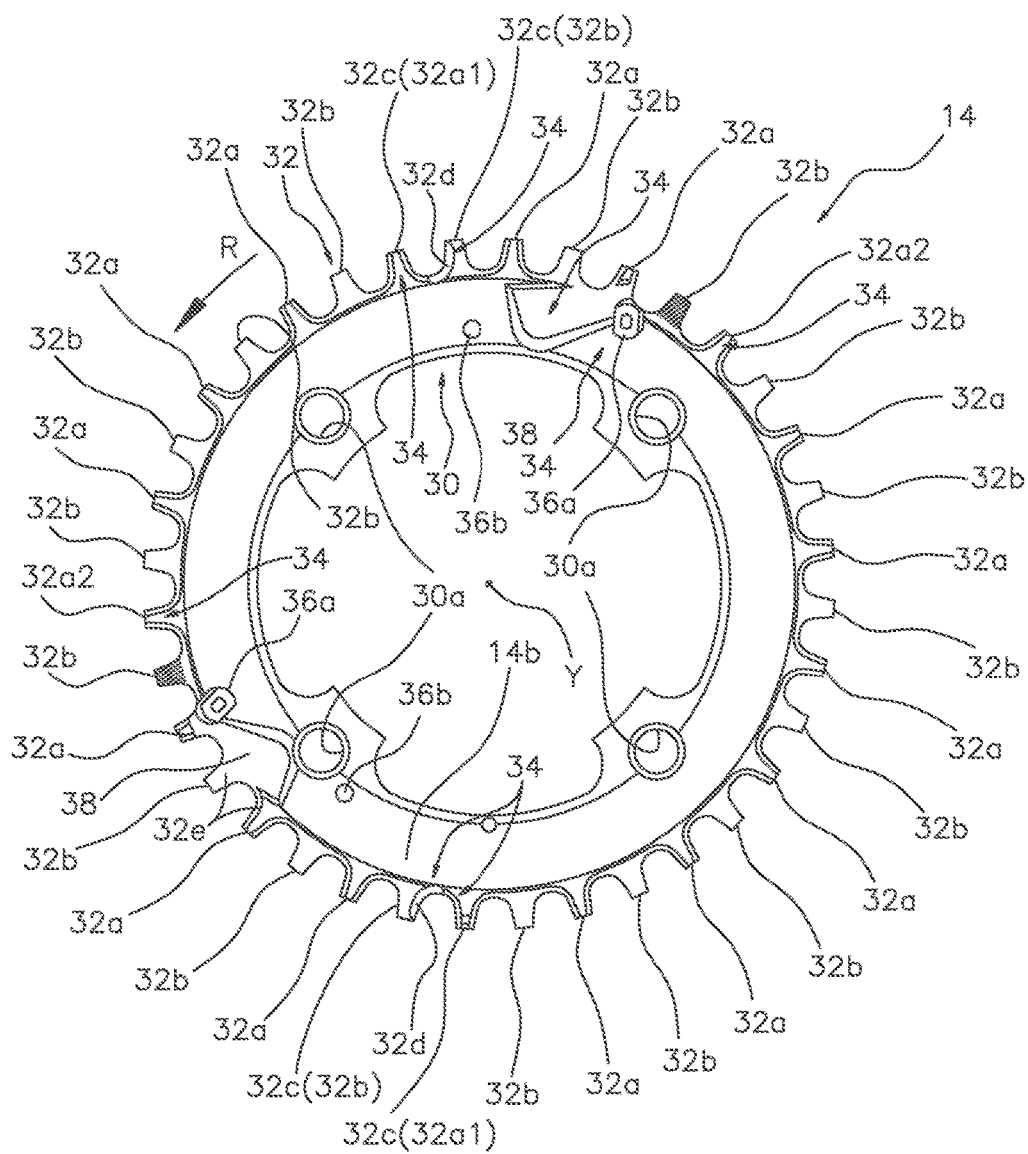
FIG. 3 is a rear view of the first sprocket.

The first shifting teeth 32c have first guide surfaces 32d for guiding the chain 2 in a first surface 14a (see FIG. 2) side and a second surface 14b (see FIG. 3) side of the first sprocket 14, as shown in FIGS. 2 and 3. The first guide surfaces 32d are an example of a guide surface. The first surface 14a of the first sprocket 14 is the front surface disposed on the axially outer side farther from the bicycle frame when the crank assembly 10 is mounted to the bicycle. The second surface 14b is the rear surface disposed on the axially inner side nearer to the bicycle frame. The first guide surfaces 32d are formed as being recessed so as to gradually decrease in thickness toward the sides of the first shifting teeth 32c.

The first protuberance 36a is provided protruding in the second surface 14b of the first sprocket main body 30 in order to guide the chain 2 to the teeth 32 of the first sprocket 14. The second protuberance 36b is provided protruding in the second surface 14b of the first sprocket main body 30 in order to guide the chain 2 to the first protuberance 36a. The first protuberance 36a and the second protuberance 36b are an example of a first area of a shifting area. In the first embodiment, the first protuberance 36a and the second protuberance 36b are provided as a pair (a plurality) spaced at intervals in the circumferential direction. The first protuberance 36a guides the chain to the second teeth 32b, which are shown by hatching in FIG. 3 and are upstream from the first protuberance 36a in the advancing rotational direction R of the bicycle crank assembly 10 The first protuberance 36a is provided protruding in the second surface 14b of the first sprocket main body 30 in order to guide the chain 2 to the teeth 32 of the first sprocket 14. The second protuberance 36b is provided protruding in the second surface 14b of the first sprocket main body 30 in order to guide the chain 2 to the first protuberance 36a. In the first embodiment, the first protuberance 36a and the second protuberance 36b are provided as a pair (a plurality) spaced at intervals in the circumferential direction. The first protuberance 36a guides the chain to the second teeth 32b, which are shown by hatching in FIG. 3 and are upstream from the first protuberance 36a in the advancing rotational direction R of the bicycle crank assembly 10.

The distance L1 between the first protuberance 36a and the second protuberance 36b is greater than the longitudinal length L2 of the outer link plate 2a and/or the inner link plate 2b of the chain 2, as shown in FIG. 1. The distance L1 between the first protuberance 36a and the second protuberance 36b may also be either equal to the longitudinal length L2 of the outer link plate 2a and/or the inner link plate 2b of the chain 2, or less than the longitudinal length L2. The first protuberance 36a and the second protuberance 36b are "swaged" securely to the first sprocket 14 by being plastically deformed. In the present embodiment, the first protuberance 36a is larger in diameter than the second protuberance 36b.

Figure 4:
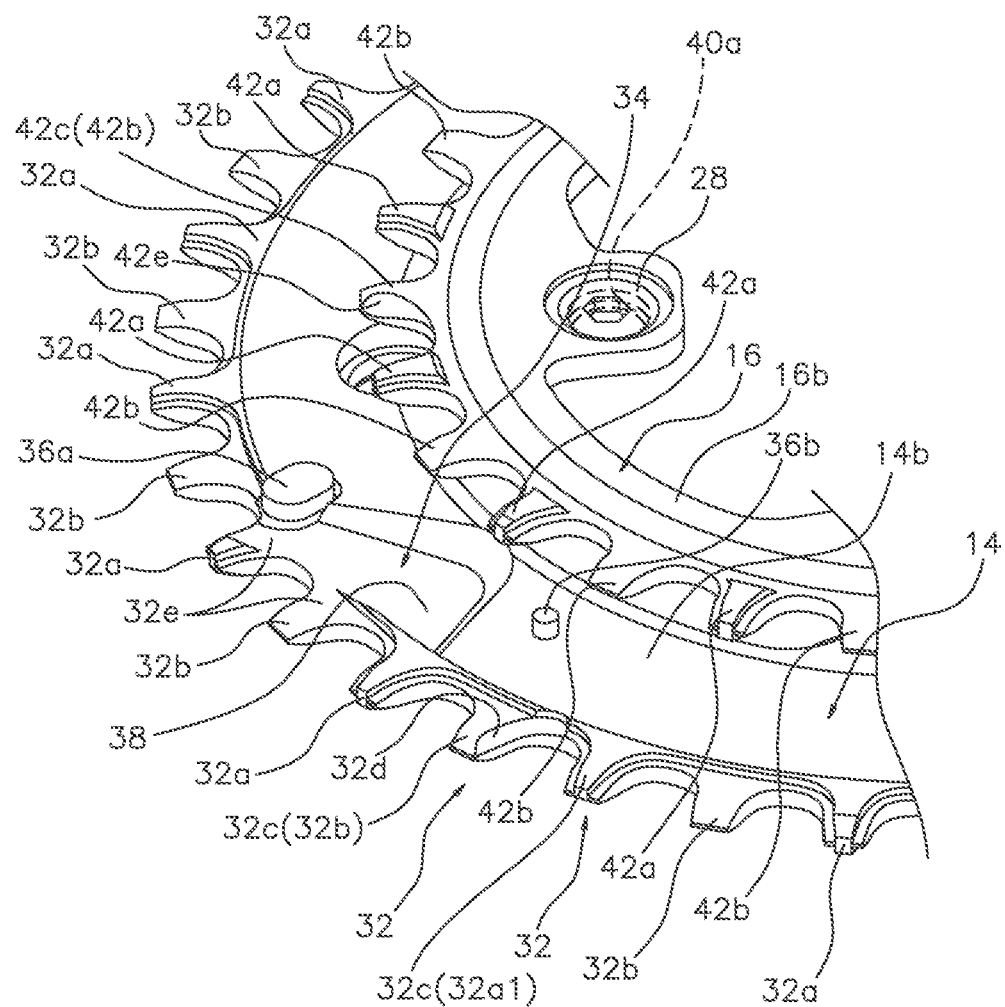
FIG. 4 is a partial rear perspective view of the first and second sprockets.

The concave part 38 is formed in order to make it easier for the chain 2 supported on the first protuberance 36a to engage with the teeth of the first sprocket 14, as shown in FIGS. 3 and 4. Therefore, the concave part 38 is disposed in proximity to the first protuberance 36a and farther diametrally (radially) inward than the base portion 32e of the teeth 32. In the first embodiment, the concave part 38 is disposed downstream from the first protuberance 36a in the advancing rotational direction R, and is formed recessed into a substantially triangular shape which inclined upstream (clockwise in FIG. 3) from the diametrally inner side to the outer side. The chain 2 is thereby readily supported on the first protuberance 36a.

Second Sprocket

Figure 6:
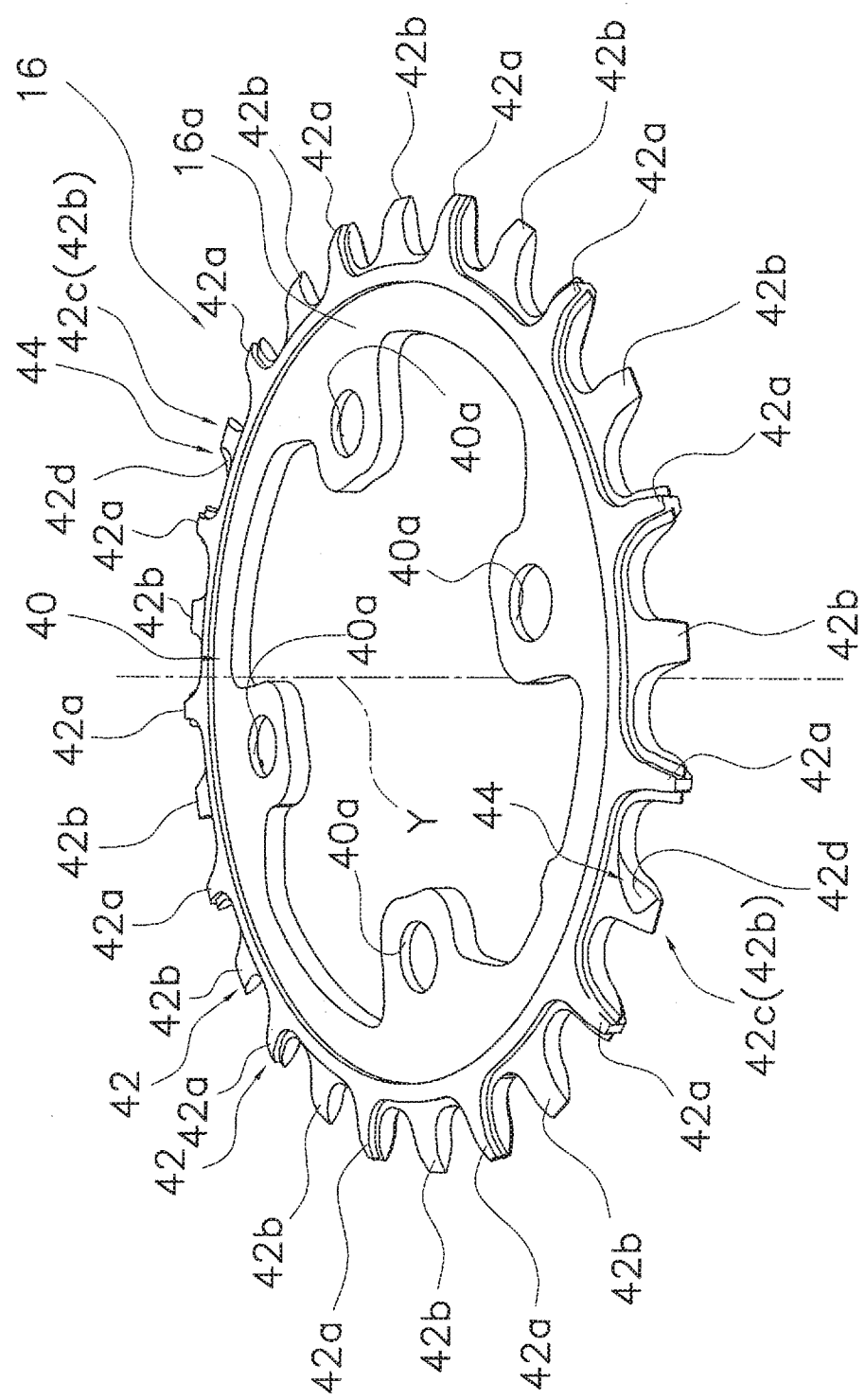
FIG. 6 is a front perspective view of the second sprocket.

The second sprocket 16 has a rotational center axis Y, and comprises a second sprocket main body 40, and a plurality (e.g. 20 to 40) of teeth 42 disposed along the circumferential direction on the radially outer side of the second sprocket main body 40, as shown in FIGS. 4 and 6. The second sprocket main body 40 is an example of a sprocket main body. A second shifting area 44 is an example of a shifting area. The second sprocket main body 40 and the teeth 42 are made of metal and are formed integrally. The second sprocket main body 40 has a plurality (e.g. four) of second fixed parts 40a fixed to the second attachment parts 24b (see FIG. 1) of the sprocket attachment anus 24 and disposed at intervals in the circumferential direction. The second fixed parts 40a are configured from through-holes, and are disposed in positions facing the plurality of second attachment parts 24b. The second sprocket 16 is fixed to the sprocket attachment arms 24 by the second fixing bolts 28 (see FIG. 4) threaded with the second attachment parts 24b.

The teeth 42 include at least one third tooth 42a having a third maximum axial width W3 (see FIG. 5), and at least one fourth tooth 42b having a fourth maximum axial width W4. The third teeth 42a are formed so as to be capable of engaging with the outer link plate 2a of the chain 2. The fourth teeth 42b are formed so as to be capable of engaging with the inner link plate 2b of the chain 2. The third maximum axial width W3 is greater than the fourth maximum axial width W4. The third maximum axial width W3 of the third teeth 42a is preferably in a range of 2.5 mm or greater and 5.4 mm or less, and more preferably in a range of 3.0 mm or greater and 4.5 mm or less. When the third maximum axial width W3 of the third teeth 42a is in such a range, the third teeth 42a readily engage with the outer link plate 2a without engaging with the inner link plate 2b. The fourth maximum axial width W4 of the fourth teeth 42b is preferably in a range of 1.5 mm or greater and 2.3 mm or less. When the fourth maximum axial width W4 of the fourth teeth 42b is in such a range, the fourth teeth 42b have the necessary rigidity and readily engage with the inner link plate 2b.

Figure 5:
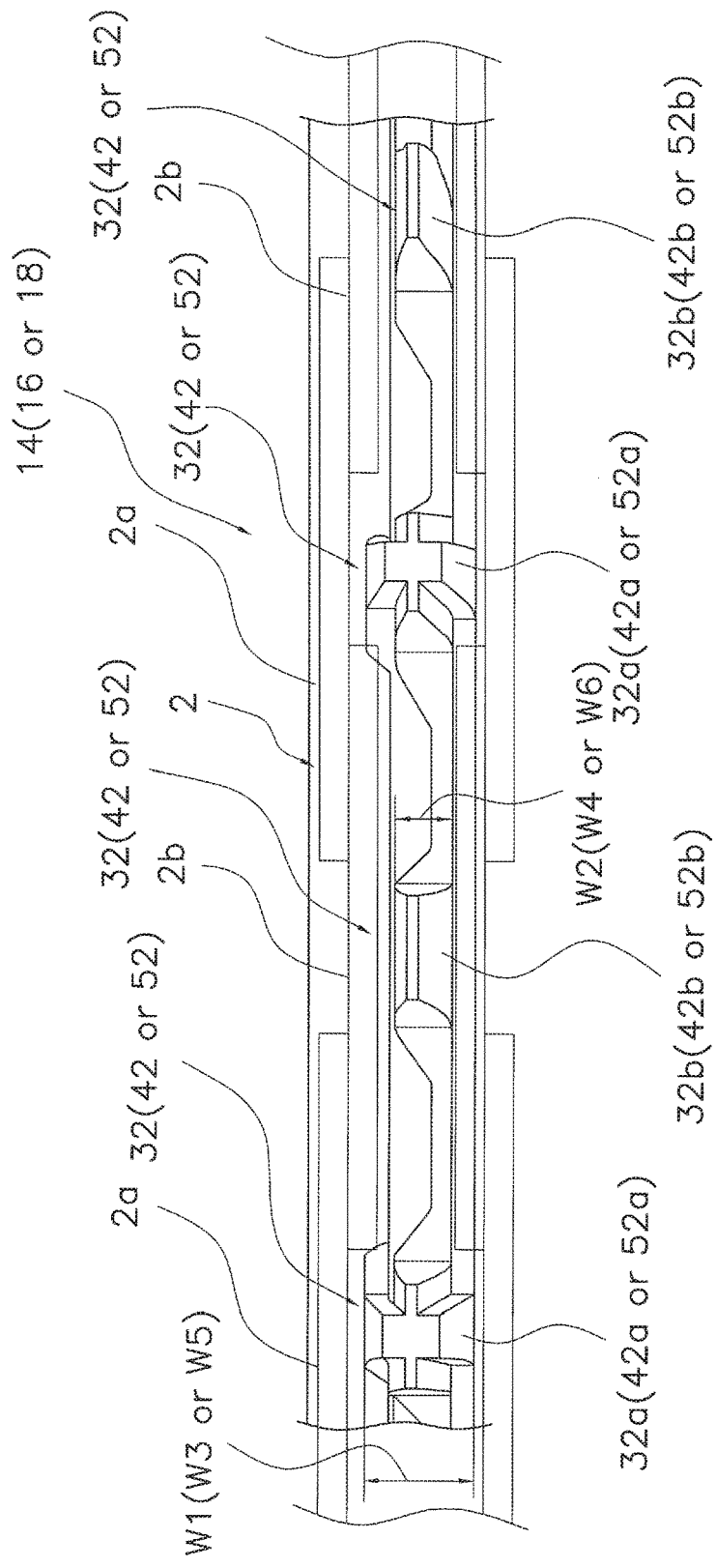
FIG. 5 is a partial side view of the first sprocket, the second sprocket, or the third sprocket as seen from the radially outer side.

The third teeth 42a are formed into a + (plus) shape as seen from the radially outer side, as shown in FIGS. 4, 5 and 6. The fourth teeth 42b are formed into a − (minus) shape as seen from the radially outer side. The third teeth 42a and the fourth teeth 42b are formed tapering so as to gradually decrease in axial width toward the radially outer side. The third teeth 42a and the fourth teeth 42b thereby engage more readily with the outer link plate 2a and the inner link plate 2b.

At least some of the third teeth 42a and the fourth teeth 42b are disposed alternately in the circumferential direction, i.e. adjacent to each other, and in the first embodiment all of these teeth are disposed in this manner as shown in FIG. 6.

The second shifting area 44 includes the second shifting teeth 42c, which are provided to at least one of the teeth 42. The second shifting teeth 42c are an example of shifting teeth. In the first embodiment, a plurality (e.g., two) of second shifting teeth 42c is provided. The second shifting teeth 42c are provided at intervals in the circumferential direction. The second shifting teeth 42c have second guide surfaces 42d for guiding the chain 2 in a first surface 16a (see FIG. 6) side and a second surface 16b (see FIG. 4) side of the second sprocket 16, as shown in FIGS. 4 and 6. The second guide surfaces 42d are an example of a guide surface. The first surface 16a of the second sprocket 16 is the front surface disposed on the axially outer side farther from the bicycle frame when the crank assembly 10 is mounted to the bicycle, and the second surface 16b is the rear surface disposed on the axially inner side nearer to the bicycle frame. The second guide surfaces 42d are formed as being recessed so as to gradually decrease in thickness toward the sides of the second shifting teeth 42c.

In the first embodiment, the second shifting area 44 may contain the protuberances or concave part of the first shifting area 34. However, the second shifting area may also contain only the protuberances or only the concave part.

Shifting Action in Crank Assembly

In the bicycle crank assembly 10 having such a configuration. When the up shifting action from the second sprocket 16 to the first sprocket 14 is performed by a front derailleur (not shown), the bicycle crank assembly 10 is rotated in the advancing rotational direction R. In this state, when the front derailleur moves from a position facing the second sprocket 16 to a position facing the first sprocket 14, the chain 2 separates from the teeth of the second sprocket 16. Having separated from the second sprocket 16, the chain 2 is supported on the second protuberance 36b and moved to the radially outer side, and is also supported on the first protuberance 36a and guided to the teeth 32 of the first sprocket 14. At this time, the chain 2 is guided to the first protuberance 36a by the concave part 38 of the first shifting area 34. Therefore, the chain 2 supported on the second protuberance 36b is reliably supported on the first protuberance 36a.

When a down shifting operation from the first sprocket 14 to the second sprocket 16 is performed by the front derailleur (not shown), the bicycle crank assembly 10 is rotated in the advancing rotational direction R. In this state, when the front derailleur moves from a position facing the first sprocket 14 to a position facing the second sprocket 16, the chain 2 separates from the teeth of the first sprocket 14. Having separated from the first sprocket 14, the chain 2 is guided toward the teeth 42 of the second sprocket 16 and engaged with the teeth 42.

Second Embodiment

Figure 7:
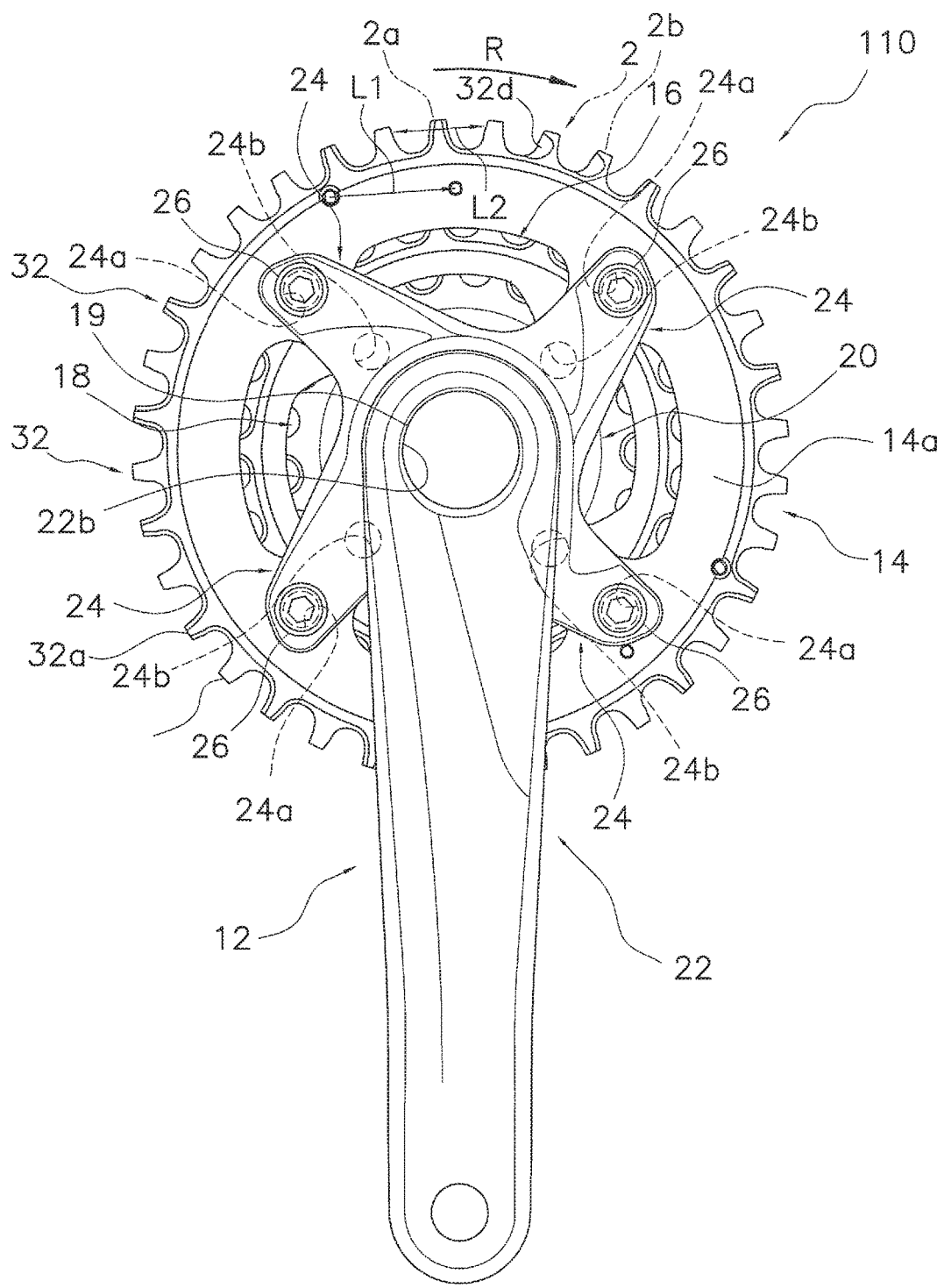
FIG. 7 is a front view of the bicycle crank assembly according to the second embodiment of the present invention.

In the first embodiment, the bicycle crank assembly 10 has a first sprocket 14 and a second sprocket 16, but the crank assembly 110 of the second embodiment further comprises a third sprocket 18 in addition, to the first sprocket 14 and the second sprocket 16, as shown in FIG. 7. The third sprocket 18 has fewer teeth than the second sprocket 16. The first sprocket 14 and the second sprocket 16 have the same configurations as the first embodiment and are therefore denoted in FIG. 7 by the same symbols and are not described.

Third Sprocket

Figure 8:
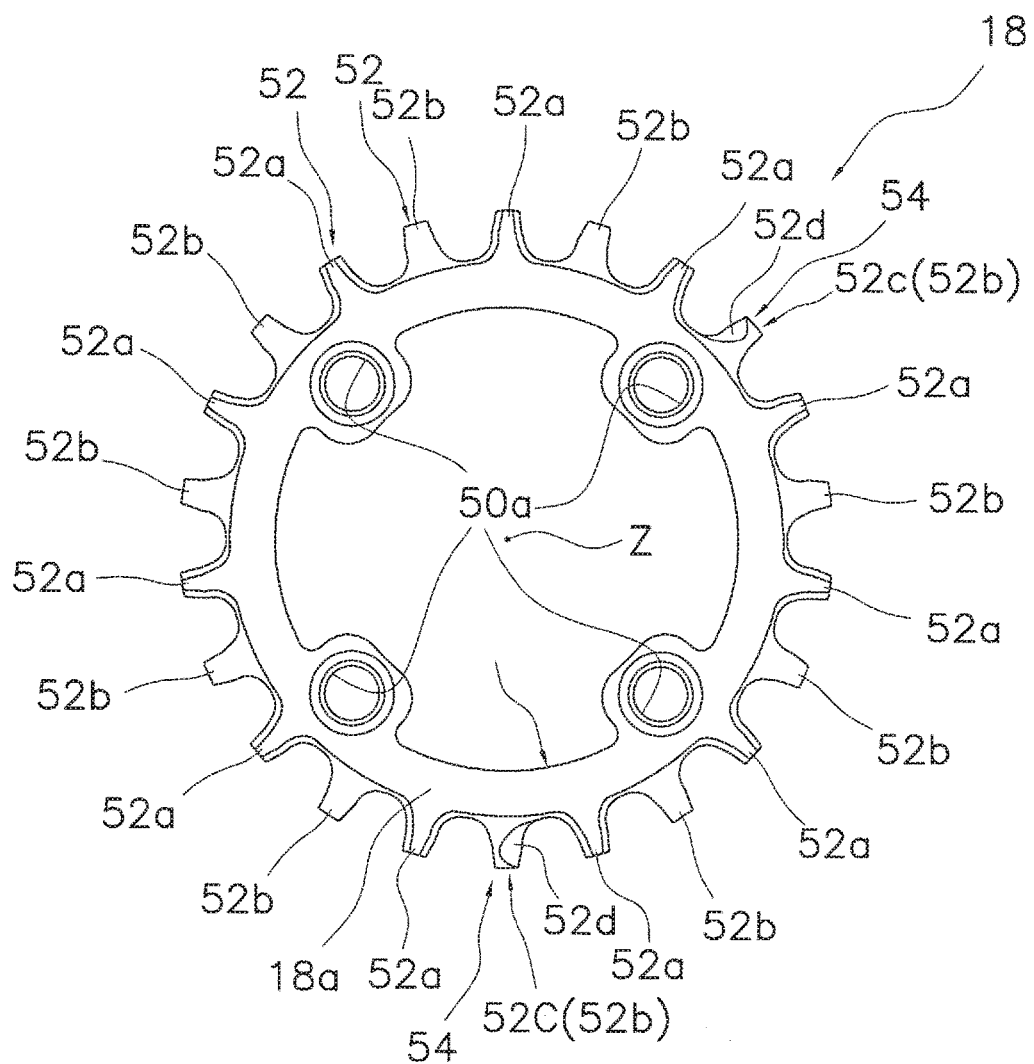
FIG. 8 is a surface view of the third sprocket.

The third sprocket 18 has a rotational center axis Z, and comprises a third sprocket main body 50, a plurality (e.g. 20 to 30) of teeth 52 disposed along the circumferential direction on the radially outer side of the third sprocket main body 50, and a third shifting area 54, as shown in FIG. 8. The third sprocket main body 50 is an example of a sprocket main body. The third shifting area 54 is an example of a shifting area. The third sprocket main body 50 and the teeth 52 are made of metal and are formed integrally. The third sprocket main body 50 has a plurality (e.g. four) of third fixed parts 50a fixed to the second attachment parts 24b (see FIG. 1) of the sprocket attachment arms 24 and disposed at intervals in the circumferential direction. The third fixed parts 50a are configured from through-holes, and are disposed in positions facing the plurality of second attachment parts 24b. The third sprocket 18, together with the second sprocket 16, is fixed to the sprocket attachment arms 24 by the second fixing bolts 28 (see FIG. 4) threaded with the second attachment parts 24b.

The teeth 52 include at least one fifth tooth 52a having a fifth maximum axial width W5 (see FIG. 5), and at least one sixth tooth 52b having a sixth maximum axial width W6. The fifth teeth 52a are formed so as to be capable of engaging with the outer link plate 2a of the chain 2. The sixth teeth 52b are formed so as to be capable of engaging with the inner link plate 2b of the chain 2. The fifth maximum axial width W5 is greater than the sixth maximum axial width W6. The fifth maximum axial width W5 of the fifth teeth 52a is preferably in a range of 2.5 mm or greater and 5.4 mm or less, and more preferably in a range of 3.0 mm or greater and 4.5 mm or less. When the fifth maximum axial width W5 of the fifth teeth 52a is in such a range, the fifth teeth 52a readily engage with the outer link plate 2a without engaging with the inner link plate 2b. The sixth maximum axial width W6 of the sixth teeth 52b is preferably in a range of 1.5 mm or greater and 2.3 mm or less. When the sixth maximum axial width W6 of the sixth teeth 52b is in such a range, the sixth teeth 52b have the necessary rigidity and readily engage with the inner link plate 2b.

The fifth teeth 52a are formed into a + (plus) shape as seen from the radially outer side, as shown in FIGS. 5 and 8. The sixth teeth 52b are formed into a − (minus) shape as seen from the radially outer side. The fifth teeth 52a and the sixth teeth 52b are formed tapering so as to gradually decrease in axial width toward the radially outer side. The fifth teeth 52a and the sixth teeth 52b thereby engage more readily with the outer link plate 2a and the inner link plate 2b.

At least some of the fifth teeth 52a and the sixth teeth 52b are disposed alternately in the circumferential direction, i.e. adjacent to each other, and in the first embodiment all of these teeth are disposed in this manner as shown in FIG. 8.

The third shifting area 54 includes third shifting teeth 52c, which are provided to at least one of the teeth 52. In the second embodiment, a plurality (e.g., two) of third shifting teeth 52c is provided. The third shifting teeth 52c are provided at intervals in the circumferential direction. The third shifting teeth 52c have third guide surfaces 52d for guiding the chain 2 in a first surface 18a (see FIG. 8) side and a second surface (not shown) side of the third sprocket 18, as shown in FIG. 8. The third guide surfaces 52d are an example of a guide surface. The first surface 18a of the third sprocket 18 is the front surface disposed on the axially outer side farther from the bicycle frame when the crank assembly 10 is mounted to the bicycle, and the second surface is the rear surface disposed on the axially inner side nearer to the bicycle frame. The third guide surfaces 52d are formed as being recessed so as to gradually decrease in thickness toward the sides of the third shifting teeth 52c.

In the third embodiment, the third shifting area 54 may contain the protuberances or concave part of the first shifting area 34. However, the third shifting area may also contain only the protuberances or only the concave part.

Other Embodiments

Embodiments of the present invention are described above, but the present invention is not limited to these embodiments; various alterations can be made within a range that does not deviate from the scope of the invention. Particularly, the plurality of embodiments and modifications disclosed in the specification and be arbitrarily combined as necessary.

(a) The first and second embodiments give a front sprocket as an example of a bicycle sprocket, but the present invention is not limited as such. The present invention can also be applied to a rear sprocket.

(b) In the bicycle crank assembly of the first and second embodiments, first teeth and second teeth having different axial widths are provided to all of the sprockets, but the present invention is not limited as such. Any sprocket (e.g. the second and/or third sprocket, small in diameter) may be configured from second teeth alone.

(c) In the first and second embodiments, the first teeth were formed into + shapes or T shapes as seen from the radially outer side, but the present invention is not limited as such. These teeth may also be formed into other shapes such as diamonds, trapezoids, triangles, and hexagons.

(d) In the first and second embodiments, the first shifting area 34 has the second protuberance 36b, but a second protuberance 36b need not be provided.

(e) In the first and second embodiments, there are four sprocket attachment arms 24, but the number of sprocket attachment arms is not limited to four.

(f) In the first and second embodiments, the sprocket main bodies and the pluralities of teeth are formed integrally, but the present invention is not limited as such. The sprocket main bodies and the pluralities of teeth may be formed separately. The pluralities of teeth may be made of metal, for example, and the sprocket main bodies may be made of a synthetic resin such as a carbon fiber reinforced resin or a different metal than the teeth, for example (a light metal such as aluminum, for example), to reduce weight.

(g) The shifting areas of the sprockets may include the − (minus) shaped second teeth 32b, fourth teeth 42b, and sixth teeth 52b.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A bicycle sprocket for engaging with a chain and having a rotational center axis, the bicycle sprocket being configured to be included in a multiple sprocket assembly in a position adjacent to a small sprocket that is smaller than the bicycle sprocket, the bicycle sprocket comprising:
   a sprocket main body;
   a plurality of teeth disposed along a circumferential direction on a radially outer side of the sprocket main body; and
   at least one shifting area including a first area where the chain engages with one of the plurality of teeth of the bicycle sprocket during a shifting action from the small sprocket to the bicycle sprocket and a second area where the chain separates from one of the plurality of teeth of the bicycle sprocket during a shifting action from the bicycle sprocket to the small sprocket,
   the plurality of teeth including at least one first tooth having a first maximum axial width for engaging with an outer link plate of the chain and at least one second tooth having a second maximum axial width for engaging with an inner link plate of the chain, the first maximum axial width being larger than the second maximum axial width.

2. The bicycle sprocket according to claim 1, wherein the plurality of teeth include a plurality of the first teeth.

3. The bicycle sprocket according to claim 1, wherein the plurality of teeth include a plurality of the second teeth.

4. The bicycle sprocket according to claim 1, wherein the plurality of teeth include a plurality of the first teeth and a plurality of the second teeth.

5. The bicycle sprocket according to claim 4, wherein at least some of the plurality of first teeth and the plurality of second teeth are disposed alternately in the circumferential direction.

6. The bicycle sprocket according to claim 1, wherein the first teeth and the second teeth are disposed adjacent to each other.

7. The bicycle sprocket according to claim 1, wherein the first teeth are formed into a + shape as seen from the radially outer side.

8. The bicycle sprocket according to claim 1, wherein the first teeth are formed into a T shape as seen from the radially outer side.

9. The bicycle sprocket according to claim 1, wherein the first maximum axial width of the first teeth is in a range of 2.5 mm or greater and 5.4 mm or less.

10. The bicycle sprocket according to claim 9, wherein the first maximum axial width of the first teeth is in a range of 3.0 mm or greater.

11. The bicycle sprocket according to claim 1, wherein the second maximum axial width of the second teeth is in a range of 1.5 mm or greater and 2.3 mm or less.

12. The bicycle sprocket according to claim 1, wherein the shifting area includes shifting teeth provided to at least one of any of the plurality of teeth.

13. The bicycle sprocket according to claim 12, wherein the shifting teeth have guide surfaces for guiding the chain.

14. The bicycle sprocket according to claim 13, wherein the shifting area includes at least one protuberance that is configured to support the chain, the at least one protuberance being provided on an opposite side of the bicycle sprocket as the guide surfaces.

15. The bicycle sprocket according to claim 1, wherein the shifting area includes at least one protuberance that is configured to support the chain.

16. The bicycle sprocket according to claim 12, wherein the shifting area includes at least one protuberance that is configured to support the chain.

17. The bicycle sprocket according to claim 16, wherein the shifting area includes a concave part that is disposed farther inward in a radial direction than the roots of the plurality of teeth.

18. The bicycle sprocket according to claim 15, wherein the at least one protuberance includes a first protuberance and a second protuberance that are configured to support the chain.

19. The bicycle sprocket according to claim 18, wherein a distance between the first protuberance and the second protuberance is longer than a longitudinal length of at least one the outer and inner links of the chain.

20. The bicycle sprocket according to claim 18, wherein a distance between the first protuberance and the second protuberance is either equal to or shorter than a longitudinal length of at least one the outer and inner links of the chain.

21. A multiple bicycle sprocket assembly comprising:
a first sprocket including a first sprocket body, a plurality of first sprocket teeth, and at least one first shifting area, the plurality of first sprocket teeth being disposed along a circumferential direction on a radially outer side of the first sprocket body, the plurality of first sprocket teeth including
at least one first tooth having a first maximum axial width for engaging with an outer link plate of the chain, and
at least one second tooth having a second maximum axial width for engaging with an inner link plate of the chain, the first maximum axial width being larger than the second maximum axial width; and
a second sprocket including a second sprocket body and a plurality of second sprocket teeth, the second sprocket teeth being disposed along a circumferential direction on a radially outer side of the second sprocket body, all of second sprocket teeth having a third maximum axial width for engaging with the inner link plate of the chain, the first maximum axial width being larger than the third maximum axial width.

22. The bicycle sprocket according to claim 18, wherein the first protuberance and the second protuberance are at least partially disposed farther inward in a radial direction of the bicycle sprocket than roots of the plurality of teeth.

23. The bicycle sprocket according to claim 22, wherein the first protuberance and the second protuberance spaced apart from each other in the circumferential direction.

24. The bicycle sprocket according to claim 23, wherein the shifting area includes a concave part that is disposed between the first protuberance and the second protuberance.

25. The bicycle sprocket according to claim 23, wherein the first protuberance is larger than the second protuberance, and the first protuberance is disposed upstream from the second protuberance in an advancing rotational direction of the bicycle sprocket.

26. The bicycle sprocket according to claim 23, wherein one of the at least one second tooth is disposed immediately upstream of the first protuberance in an advancing rotational direction of the bicycle sprocket.

27. The bicycle sprocket according to claim 1, wherein the shifting area includes a concave part that is disposed farther inward in a radial direction than roots of the plurality of teeth.

28. The bicycle sprocket according to claim 1, wherein the at least one shifting area includes a plurality of the shifting areas.

29. The bicycle sprocket according to claim 28, wherein the at least one shifting area includes at least a pair of the shifting areas.

30. The bicycle sprocket according to claim 1, wherein the bicycle sprocket being a front sprocket.

31. A bicycle sprocket for engaging with a chain and having a rotational center axis, the bicycle sprocket comprising:
a sprocket main body;
a plurality of teeth disposed along a circumferential direction on a radially outer side of the sprocket main body; and
at least one shifting area,
the plurality of teeth including at least one first tooth having a first maximum axial width for engaging with an outer link plate of the chain and at least one second tooth having a second maximum axial width for engaging with an inner link plate of the chain, the first maximum axial width being larger than the second maximum axial width, the at least one first tooth including a shifting tooth that is included in the at least one shifting area, the shifting tooth being formed into a T shape as seen from the radially outer side.

32. A bicycle sprocket for engaging with a chain and having a rotational center axis, the bicycle sprocket comprising:
a sprocket main body;
a plurality of teeth disposed along a circumferential direction on a radially outer side of the sprocket main body; and
at least one shifting area,
the plurality of teeth including at least one first tooth having a first maximum axial width for engaging with an outer link plate of the chain and at least one second tooth having a second maximum axial width for engaging with an inner link plate of the chain, the first maximum axial width being larger than the second maximum axial width, the first maximum axial width of the first teeth being in equal to or larger than 2.5 mm and smaller than or equal to 5.4 mm.

33. The bicycle sprocket according to claim 32, wherein the first maximum axial width of the first teeth is equal to or larger than 3.0 mm and smaller than or equal to 4.5 mm.

34. The bicycle sprocket according to claim 32, wherein the second maximum axial width of the second teeth is equal to or larger than 1.5 mm and smaller than or equal to 2.3 mm.

35. The bicycle sprocket according to claim 23, wherein the first protuberance is disposed farther outward in the radial direction than the second protuberance.

* * * * *